Aug. 15, 1939.　　　　　P. GASCO　　　　2,169,237
STATIONARY ORNAMENT FOR WHEEL HUB CAPS
Filed Jan. 4, 1938
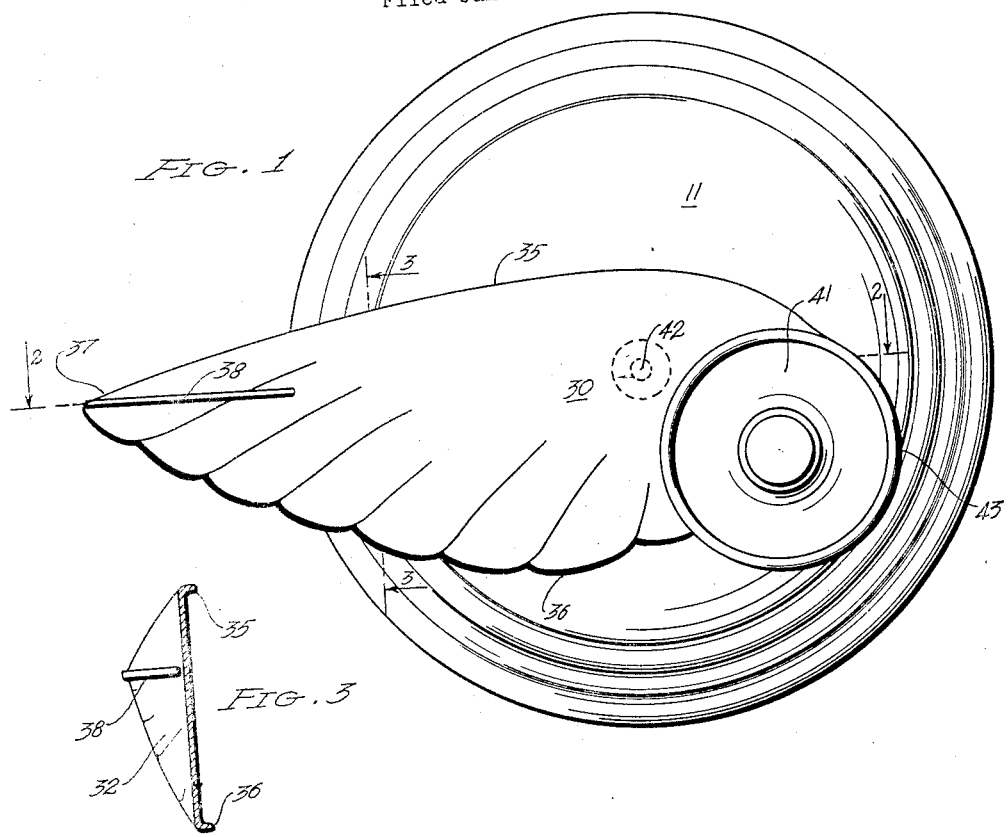
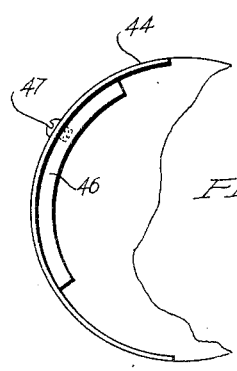
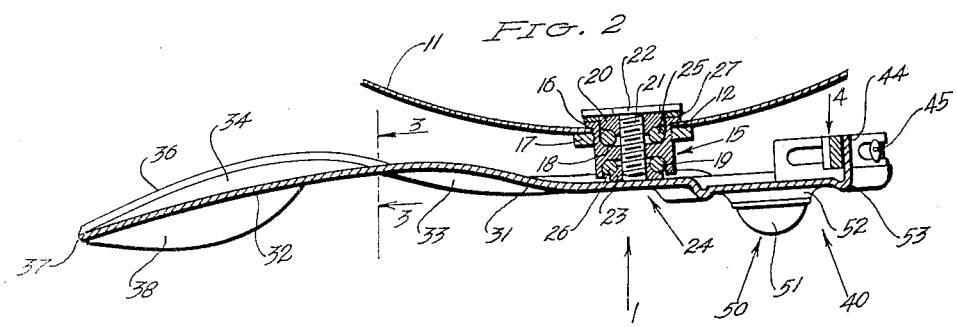
Inventor
PETE GASCO
By Hazard & Miller
Attorneys Patented Aug. 15, 1939

2,169,237

UNITED STATES PATENT OFFICE 2,169,237

STATIONARY ORNAMENT FOR WHEEL HUB CAPS

Pete Gasco, Torrance, Calif.

Application January 4, 1938, Serial No. 183,296

8 Claims. (Cl. 40—129)

My invention relates to an ornament which is mounted on the hub cap of an automobile wheel in such a manner that the ornament remains in a stationary position while the wheel is rotating by the vehicle travelling in a forward direction. A number of types of ornaments and name plates of this character have been patented in which a counterweight or such like is used to hold the name plate in the desired position when the vehicle is at rest and reliance is made on this counterweight being sufficient to maintain such name plate or ornament in the same position on the movement of the vehicle. In this type of construction the name plate or such like is mounted on the wheel or wheel hub cap by a free running or anti-friction bearing of some type.

An object and feature of my invention is in the construction and mounting of an ornament or the like by an anti-friction or ball bearing connection to the axial center of the wheel cap and in which the ornament catches the air flow past the wheel during the forward travel of the vehicle and this air flow causes the ornament to remain in a stationary position as to the vehicle while the wheel rotates. With my construction when the vehicle is travelling at high speed the air flow past the wheel flows over a vane, wing or other type of mechanical device which may also be part of the ornament and causes this to occupy a position more or less in the direction of air flow. This air flow manifestly when the vehicle is travelling in a straight line forwardly is practically horizontal and thus causes the vane, wing or other device influenced thereby to occupy substantially a horizontal position or a position in the direction of the relative air flow. The anti-friction or ball bearing located in the axial center of the hub cap permits the vane or wing type of ornament to thus remain in a more or less stationary position while the hub cap rotates at high speed.

Another object and feature of my invention is mounting an adjustable counterweight on the forward end of the vane forward of the center of rotation of the hub cap and by adjusting this I may while the vehicle is stationary, have the vane tilt or incline upwardly. However the vane is so designed that when the vehicle is travelling and develops a considerable force by the air flow which catches the vane, this vane to a certain extent overbalances the counterweight and brings the whole assembly into the desired position in regard to the front to rear direction of air flow. Another detail feature of my invention consists of mounting a reflector or the like preferably on the forward part of the vane and incorporated with the mounting for the counterbalance weight, this reflector thus reflecting light particularly at night from street lights or headlights or other vehicles and thus clearly indicating the forward portion of the vehicle.

My invention also develops a utility feature depending on the size and shape of the vane as when the vehicle is travelling at a high speed in a forward direction, the air flow over the vane causes the vane to occupy the desired position in the air stream flow and the reaction of the air on the vane develops forces reacting against any wobble of the wheels tending to maintain the vehicle in a direction of straight line travel.

My invention is illustrated in connection with the accompanying drawing, in which:

Fig. 1 is a side elevation taken in the direction of the arrow 1 of Fig. 2.

Fig. 2 is a longitudinal horizontal section on the line 2—2 of Fig. 1 in the direction of the arrows.

Fig. 3 is a vertical section through the vane on the line 3—3 of Figs. 1 and 2.

Fig. 4 is a partial inside elevation as if taken in the direction of the arrow 4 of Fig. 2 of the counterweight.

In the illustrations a dome-shaped wheel hub is indicated by the numeral 11. This as to the present line of cars is of practically standard design, the hub cap being quite large in diameter and secured to the wheel. In applying my invention it is necessary to make a center circular opening 12 in the hub cap. This will thus be in alignment with the axle of the wheel. My invention is preferably adapted for use with the front wheels of a passenger automobile, however, it may be used with the rear wheels except as to these the type of mud guards may interfere with the proper operation of the ornament.

In order to provide an anti-friction bearing, I have a bearing sleeve 15 with an inner flange 16 which fits in the opening 12 and is held in place by a nut 17 threaded on the sleeve 15 and thus clamping tight against the outside of the hub cap. These caps have a dome construction. The sleeve is provided with an inner bearing cup 18 and an outer bearing cup 19. An inner complementary race 20 is secured by soldering or the like to a bolt 21 having a thin head 22. This bolt threads into an outer complementary cone type of race 23 which is welded or otherwise secured to the wind reacting ornament 24. There is thus an inner ball bearing 25 and an outer ball bearing 26. It is preferable to have a compressible gasket 27 between the nut 22 and the flange 16 to allow for a proper fitting and adjustment of the bearings so that these will operate freely enough but not be sufficiently loose to allow the ornament to wobble.

The wind reacting ornament has a relatively large vane 30. This is shown as shaped like a wing. It preferably has merging concave and convex curves considered longitudinally indicated by the numerals 31 and 32. It is also preferable to have a warp at certain sections considered in vertical planes and indicated by the portions 33 and 34. There are also preferably inturned rims 35 at the top and 36 at the bottom. In the construction shown the wing is illustrated as tapering to a tip 37. Aligned with this tip there is a horizontal fin 38, this extending outwardly from the front surface and merging therewith. If desired the fin however may be on the rear surface.

A counterweight assembly designated by the numeral 40 includes a forward extending portion 41 of the vane, this being located forwardly of the center 42 of the anti-friction bearing. The forward circular edge 43 has an inwardly turned rim or flange 44 with an arcuate slot 45 therein. An arcuate weight preferably formed of lead indicated at 46 may be adjustably secured to the rim by a set screw 47. As a further means to counterbalance the vane or wing I employ a reflector indicated at 50. This has a light reflecting glass 51 mounted concentric in a holder frame 52, this being also concentric with a circular bead 53, this bead also forming part of the circle of the flange 44.

In the operation of my invention the counterweight is so adjusted that when the vehicle is at rest the weighted or forward end portion hangs slightly downwardly from the center 42, thus the wing or vane 30 and the fin 38 are inclined upwardly. When the vehicle moves in a forward direction on account of the anti-friction mounting of the vane and its counterweight on the hub cap these remain stationary as to rotation. As the speed of the vehicle increases the air flow develops an operative function in its flow over the vane and the fin 38 causing this vane to occupy a somewhat horizontal position and the fin 38 to be practically horizontal, these positions being to a certain extent dependent on the speed of the vehicle, that is, the relative velocity of the air flow over the vane and fin.

This construction with the proper type of vane, wing or other ornament, increases the impression of stream-lining of a vehicle and has quite an ornamental value. In addition it holds the glass reflector so that this reflects the daylight during daylight travel, the reflector preferably having a number of facets as is quite common and at night the reflector indicates the front portion of a vehicle when illuminated by street lights or headlights of other vehicles. At relatively high speeds on account of the velocity of the air flowing over the vane and the fin, the assembly is held quite steady and tends to resist any wobbling action of the wheel, therefore by using the air stream flow and the reaction through the anti-friction bearing on the hub cap, there is quite a decided reaction in steadying the front and thus the steering wheels of the vehicle. Of course this action is not so sufficiently pronounced as to interfere with the proper steering of a vehicle but of course at high speeds only very gradual turns can be made and still for such turns, so far as the vanes are concerned, the air flow is practically from front to rear of the vehicle. The action is practically not interfered with by side winds or those at an angle except of course when the vehicle is travelling quite slowly.

In describing the action of the vane assembly 30 with the fin 38, it is to be understood that this is subject to aerodynamic forces and there is a reaction of drag on the warped vane having somewhat a same functional action as the drag on an airplane wing, the vertical stabilizer and other surfaces exposed to the air flow. There is also a lift reaction. This is mainly on the fin 38. In considering these aerodynamic functions and the terminology used in aeronautics, it is to be understood that the main wind flow is from the front to the rear such as by the head-on wind developed by a fast moving vehicle. In designating the vane as being warped, this is used in the same sense as in aeronautics and denotes a certain twist on the vane. This brings into force various reactions, mainly of the nature of a drag which tends to cause the vane as a whole to trail from its journal mounting on the wheel hub.

Various changes may be made in the details of the construction without departing from the spirit or scope of the invention as defined by the appended claims.

I claim:

1. In a device as described, a wheel element, a journal structure connected to the axial center of said element, a vane having a rotatable mounting in the journal, said vane having a surface constructed and adapted to react to the drag and lift of a head-on air flow past the axial center when the wheel travels in a forward direction on the ground whereby the drag reaction of the air flow maintains the vane from rotation in relation to the wheel element.

2. In a device as described, a wheel element, a journal structure connected to the axial center of said element, a supporting member rotatably mounted in the journal and having a fin projecting outwardly in a plane substantially parallel to the axial center and rearwardly thereof, the said fin being constructed and adapted to react to the drag and lift of a head-on air flow when the wheel travels in a forward direction on the ground, the lift being adapted to bring the fin into approximately a horizontal position and to develop a drag whereby the fin trails behind the axial center and is maintained from rotation with the wheel.

3. In a device as described in which a wheel element has an axially centered journal combined with an air flow drag reacting vane assembly having a bearing in said journal, the said assembly including a counterweight and a trailing air flow drag reacting vane, the counterweight and the main portion of the vane being on opposite sides of the center whereby when the wheel rolls in a forward direction over the ground the drag of the head-on air flow over the vane retains such vane from rotation with the wheel and trailing rearwardly from the axial center.

4. In a device as described and claimed in claim 3, the said vane having a surface mainly approximating a vertical plane and having a fin connected thereto at substantially right angles, the fin being adapted by the lift reaction of the head-on air flow to occupy substantially a horizontal plane.

5. In a device as described and claimed in claim 3, a reflector mounted on the forward part of the vane assembly adjacent the counterweight and adapted to partly balance the portion of the vane opposite the axial center.

6. In a device as described, an element of a wheel having an anti-friction journal and bearing assembly, an air flow reacting structure mounted in the journal and bearing structure and including a counterweight and an air flow reacting vane, the vane having a twisted type of warped surface adapted to react by a drag resistance to the head-on air flow thereover in the forward travel and rotation of the wheel element, such drag reaction retaining the vane and structure connected thereto from rotation with the wheel element and with the main portion of the vane trailing rearwardly from the axial center of the wheel element.

7. In a device as described and claimed in claim 6, the said vane terminating at its rear end at a tapering tip and a fin at substantially right angles to the vane extending forwardly from said tip, the fin being adapted to have a lift reaction with the air flow and to occupy substantially a horizontal position.

8. In a device as described and claimed in claim 6, the counterweight including a curved flange and a complementary curved weight suitably attached to said flange, there being a circular bead with a portion thereof conforming to the curve of the rim with the counterweight, said bead being located entirely forward of the journal and bearing structure and a reflector mounted in the forward portion of the air flow reacting vane and concentric with the said bead.

PETE GASCO.